(12) United States Patent
Takemura et al.

(10) Patent No.: US 7,645,990 B2
(45) Date of Patent: Jan. 12, 2010

(54) THERMAL-TYPE INFRARED IMAGING DEVICE AND OPERATION METHOD THEREOF

(76) Inventors: Kouji Takemura, c/o NEC Corporation, 7-1, Shiba 5-chome, Minato-ku, Tokyo (JP); Kazuyuki Egashira, c/o NEC Corporation, 7-1, Shiba 5-chome, Minato-ku, Tokyo (JP); Yutaka Tanaka, c/o NEC Corporation, 7-1, Shiba 5-chome, Minato-ku, Tokyo (JP)

( * ) Notice: Subject to any disclaimer, the term of this patent is extended or adjusted under 35 U.S.C. 154(b) by 0 days.

(21) Appl. No.: 11/928,269

(22) Filed: Oct. 30, 2007

(65) Prior Publication Data

US 2008/0099679 A1      May 1, 2008

(30) Foreign Application Priority Data

Oct. 31, 2006    (JP)    .............................. 2006-295681

(51) Int. Cl.
    *H01L 27/16*    (2006.01)
(52) U.S. Cl. .................................................... 250/332
(58) Field of Classification Search ................... 250/332
    See application file for complete search history.

(56) References Cited

U.S. PATENT DOCUMENTS

| | | | |
|---|---|---|---|
| 5,101,108 A | | 3/1992 | Gaalema et al. |
| 5,260,225 A | * | 11/1993 | Liu et al. .................... 438/54 |
| 5,698,852 A | | 12/1997 | Tanaka |
| 6,154,252 A | * | 11/2000 | Tanaka ........................ 348/164 |
| 6,211,915 B1 | | 4/2001 | Harada |
| 2005/0199813 A1 | * | 9/2005 | Van Bogget ............. 250/338.1 |

FOREIGN PATENT DOCUMENTS

| | | |
|---|---|---|
| JP | 8105794 | 4/1996 |
| JP | 9203659 | 8/1997 |

OTHER PUBLICATIONS

European Search Report for EP Patent Application 07020220.5, dated Jan. 18, 2008.

* cited by examiner

*Primary Examiner*—David P Porta
*Assistant Examiner*—Shun Lee

(57) ABSTRACT

Thermal-type infrared imaging device comprises an infrared ray detection unit in which pixels, each of which includes a bolometer, are arranged two-dimensionally; and a signal processing unit that sequentially reads signal of each bolometer in synchronization with switching operation of a horizontal shift register and a vertical shift register, integrates the read signal using an integration circuit, and outputs the integrated signal. The signal processing unit is configured so that it can set a sensitivity (for example, voltage applied to bolometer, capacitance of a capacitor in the integration circuit, and/or period of time for integrating the signal) for each pixel according to a predetermined pattern in synchronization with switching operation for classifying a plurality of pixels into a plurality of types of pixels for which different sensitivities are set, for example, high-sensitivity pixels 15 with a narrow temperature measurement range and a high temperature resolution and low-sensitivity pixels 16 with a wider temperature measurement range and a lower temperature resolution than those of the high-sensitivity pixels 15.

16 Claims, 7 Drawing Sheets

15; HIGH-SENSITIVITY PIXEL
16; LOW-SENSITIVITY PIXEL
17; INTERMEDIATE-SENSITIVITY PIXEL

FIG. 2

| L | H | L | H | L | H |
|---|---|---|---|---|---|
| H | L | H | L | H | L |
| L | H | L | H | L | H |
| H | L | H | L | H | L |

15; HIGH-SENSITIVITY PIXEL
16; LOW-SENSITIVITY PIXEL

FIG. 3

| H | H | L | L | H | H |
|---|---|---|---|---|---|
| H | H | L | L | H | H |
| L | L | H | H | L | L |
| L | L | H | H | L | L |

15; HIGH-SENSITIVITY PIXEL
16; LOW-SENSITIVITY PIXEL

FIG. 4

|   |   |   |   |   |   |
|---|---|---|---|---|---|
| H | H | L | H | H | L |
| H | L | H | H | L | H |
| L | H | H | L | H | H |
| H | H | L | H | H | L |
| H | L | H | H | L | H |

16; LOW-SENSITIVITY PIXEL

15; HIGH-SENSITIVITY PIXEL

FIG.6

| L | M | H | L | M | H |
|---|---|---|---|---|---|
| M | H | L | M | H | L |
| H | L | M | H | L | M |
| L | M | H | L | M | H |

15; HIGH-SENSITIVITY PIXEL

16; LOW-SENSITIVITY PIXEL

17; INTERMEDIATE-SENSITIVITY PIXEL

US 7,645,990 B2

THERMAL-TYPE INFRARED IMAGING DEVICE AND OPERATION METHOD THEREOF

REFERENCE TO RELATED APPLICATION

This application is based upon and claims the benefit of the priority of Japanese patent application No. 2006-295681, filed on Oct. 31, 2006, the disclosure of which is incorporated herein in its entirety by reference thereto.

FIELD OF THE INVENTION

The present invention relates to an imaging device, particularly to a thermal-type infrared imaging device and operation method thereof, and more particularly to a thermal-type infrared imaging device, which uses bolometers as infrared ray (IR ray) detection devices, and operation method thereof.

BACKGROUND OF THE INVENTION

A thermal-type infrared imaging device is known that uses bolometers as detectors for imaging the temperature distribution of a subject. A bolometer is a device that detects an infrared ray through the operation on the phenomenon that the resistance value of a resistor varies when an infrared ray enters the resistor. The thermal-type infrared imaging device has a two-dimensional matrix array of bolometers from which the thermal-type infrared imaging device electrically reads a change in the resistance of each bolometer to acquire the infrared-ray, two-dimensional image of a subject (target to be measured).

The thermal-type imaging device described above has a circuit for integrating the output because the output of each bolometer is low. FIG. 7 shows the configuration of a circuit that reads a change in the bolometer resistance according to the amount of the infrared rays received from a subject. As shown in FIG. 7, the resistance change of a bolometer 21 is voltage-converted (converted to voltage) by an integration circuit. The general electrical theory of an integration circuit gives the following relation.

Output voltage=Voltage applied to bolometer/Bolometer resistance value/Capacitance value of integration capacitor×Integration time Using this relation, the thermal-type infrared imaging device adjusts an output voltage 25 and reads it in an output voltage range 26 for use in imaging by determining a bias voltage 22 applied to the bolometer 21, the capacitance of an integration capacitor 24 and the integration time, respectively.

The sensitivity of the bolometer 21 is determined in association with the output voltage 25, and the measurement temperature range of a subject is limited by an output voltage range 26 ranging from Dmin to Dmax (For example, see Patent Documents 1 and 2).

[Patent Document 1]
  Japanese Patent Kokai Publication No. JP-A-8-105794

[Patent Document 2]
  Japanese Patent Kokai Publication No. JP-A-9-203659

SUMMARY OF THE DISCLOSURE

The following analyses are presented by the present invention. The entire disclosure of Patent Documents 1 and 2 are incorporated herein by reference thereto.

It should be noted that there is a tradeoff between the temperature measurement range and the temperature resolution as shown in FIG. 8. Therefore, when a high sensitivity is set in the same output voltage range, the temperature resolution is improved but the temperature measurement range is narrowed (see high-sensitivity area 28 in FIG. 8); conversely, when a low sensitivity is set, the temperature resolution is decreased but the temperature measurement range is widen (see low-sensitivity area 29 in FIG. 8).

According to Patent Document 1 given above, this sensitivity is adjusted to prevent a variation among the pixels of signals detected in a predetermined temperature measurement range and at a predetermined temperature resolution that are used as the base. The problem here is that, when the temperature of a subject exceeds the temperature measurement range that is set, the image output becomes saturated and all temperatures equal to or higher than a predetermined value are output as a signal of the upper limit temperature, resulting in a loss of the temperature information. On the other hand, when the temperature distribution of a subject is narrow compared to a sensitivity that has been set, a sufficient temperature resolution is not obtained and, so, appropriate temperature information cannot be output. This problem requires the user to change the sensitivity in order to output an appropriate infrared ray image when the sensitivity setting differs much from a right setting for the subject temperature.

For example, to image a fire site, the following two requirements must be satisfied: one is a temperature resolution that is high enough to identify an environmental temperature near the normal temperature and the other is a temperature measurement range that is wide enough to determine a high-temperature source where the fire started. However, because there is a tradeoff between the temperature resolution and the temperature measurement range in a predetermined output voltage range as described above, it is difficult to achieve both a high temperature resolution and a wide temperature measurement range at the same time. Thus, in the case with the fire site given above, for instance, the thermal-type infrared imaging device the user is required to change the sensitivity setting of according to the situation, making the operation complex. Failure to do so results in the problem that the temperature information is lost or appropriate temperature information cannot be obtained.

In view of the foregoing, it is a main object of the present invention to provide an imaging device, particularly, a thermal-type infrared imaging device and its operation method that can achieve both a high temperature resolution and a wide temperature measurement range at the same time without requiring the user to change the setting.

According to a first aspect of the present invention there is provided a thermal-type infrared imaging device at least comprising: an infrared ray detection unit in which a plurality of pixels, each of which includes an infrared ray detection device that converts an infrared ray of a subject to an electrical signal, are arranged two-dimensionally; and a signal processing unit that processes signals from the infrared ray detection unit; wherein the signal processing unit sets a sensitivity of each of the pixels according to a predetermined pattern for classifying the plurality of pixels into pixels of a plurality of types having different sensitivities.

According to a second aspect of the present invention there is provided a thermal-type infrared imaging device at least comprising: an infrared ray detection unit in which a plurality of pixels, each of which includes an infrared ray detection device that converts an infrared ray of a subject to an electrical signal, are arranged two-dimensionally; and a signal processing unit that sequentially reads a signal of each of the infrared ray detection devices through switching operation and amplifies and processes the signal according to a sensitivity that is set; wherein the signal processing unit comprises control means for setting the sensitivity of each of the pixels according to a predetermined pattern and the plurality of pixels are classified by the control means into a plurality of types of pixels having different sensitivities.

In the present invention, the control means sets the sensitivity by adjusting at least one of a voltage applied to the infrared ray detection device, a capacitance of a capacitor for integrating the signal, and a period of time for integrating the signal.

In the present invention, the plurality of types of pixels are composed of pixels of a first type for which a relatively high sensitivity is set and pixels of a second type for which a relatively low sensitivity is set and the pixels are arranged in such a way that pixels of the same type are not adjacent to one another (not contiguous).

In the present invention, the infrared ray detection unit is preferably a bolometer element whose resistance value varies according to an amount of received infrared ray or rays.

According to a third aspect of the present invention there is provided an operation method for operating a thermal-type infrared imaging device comprising at least an infrared ray detection unit in which a plurality of pixels, each of which includes an infrared ray detection device that converts an infrared ray or a subject to an electrical signal, are arranged two-dimensionally; and a signal processing unit that processes signals from the infrared ray detection unit. The operation method at least comprises: a first step of setting, by the signal processing unit, a sensitivity for each of the pixels according to a predetermined pattern for classifying the plurality of pixels into a plurality of types of pixels having different sensitivities; and a second step of processing signals from one of the types of pixels according to the temperature of the subject.

In the present invention, in the first step, the sensitivity is set by adjusting at least one of a voltage applied to the infrared ray detection device, a capacitance of a capacitor for integrating the signal, and a period of time for integrating the signal.

In the present invention, the following configuration is possible, for example: the plurality of types of pixels are composed of pixels of the first type for which a relatively high sensitivity is set and pixels of the second type for which a relatively low sensitivity is set, and the pixels are arranged in such a way that pixels of the same type are not adjacent (contiguous) to one another and, in the second step, an infrared ray image is generated based on signals from the pixels of the first type and, if the signals from the pixels of the first type exceed a predetermined threshold, an infrared ray image is generated based on signals from the pixels of the second type.

As described above, the signal processing unit sets the sensitivity of each pixel according to a predetermined pattern in synchronization with the switching operation for reading the signal of the infrared ray detection device of the pixel and classifies a plurality of pixels into a plurality of types of pixels having different sensitivities. The thermal-type infrared imaging device having such configuration can achieve a high temperature resolution and a wide temperature measurement range at the same time without requiring the user to change the sensitivity setting even when a subject with a wide temperature range is imaged.

The same principle as the thermal-type infrared imaging device and the operation method can be applied to an imaging device which has pixels of a plurality of types of pixels having different sensitivities. In such a device, pixels may be sensitive of any ray(s) or beam(s) incident to the pixel(s).

According to a third aspect, there is provided an imaging device at least comprising:

a ray detection unit in which a plurality of pixels, each of which includes a ray detection device that converts a ray of a subject to an electrical signal, are arranged two-dimensionally; and a signal processing unit that processes signals from the ray detection unit; wherein the signal processing unit sets a sensitivity of each of the pixels according to a predetermined pattern for classifying the plurality of pixels into pixels of a plurality of types having different sensitivities. Here, the term "infrared ray" in the preceding aspects may be replaced by "ray (or beam)" in general.

According to a fourth aspect, there is provided an operation method for operating an imaging device as mention in the second aspect, in which the term "infrared ray" is replaced by "ray (or beam)".

The meritorious effects of the present invention are summarized as follows.

The thermal-type infrared imaging device and its operation method of the present invention can achieve a high temperature resolution and a wide temperature measurement range at the same time without requiring the user to change the sensitivity setting.

The reason is that the present invention provides a thermal-type infrared imaging device at least comprising an infrared ray detection unit in which pixels, each of which includes an infrared ray detection device, are arranged in a two-dimensional matrix; and a signal processing unit that processes signals from the infrared ray detection unit. The signal processing unit sets the sensitivity of each of the pixels according to a predetermined pattern in synchronization with the switching operation for reading the signal of the infrared ray detection device of each pixel and classifies a plurality of pixels into a plurality of types of pixels having different sensitivities, such as pixels for which high sensitivity (narrow temperature measurement range—high temperature resolution) is set and pixels for which low sensitivity (wide temperature measurement range—low temperature resolution) is set. Therefore, the thermal-type infrared imaging device can achieve a fine temperature resolution near the room temperature and, at the same time, a temperature measurement range wide enough for measuring even a high-temperature subject, without requiring the user to change the sensitivity setting.

BRIEF DESCRIPTIONS OF THE DRAWINGS

FIG. 2 is a diagram showing an example of the pixel arrangement in the thermal-type infrared imaging device in the first exemplary embodiment of the present invention.

FIG. 3 is a diagram showing another example of the pixel arrangement in the thermal-type infrared imaging device in the first exemplary embodiment of the present invention.

FIG. 4 is a diagram showing another example of the pixel arrangement in the thermal-type infrared imaging device in the first exemplary embodiment of the present invention.

FIG. 6 is a diagram showing an example of the pixel arrangement in a thermal-type infrared imaging device in a second exemplary embodiment of the present invention.

PREFERRED MODES OF THE INVENTION

As described in Description of the Related Art, a thermal-type infrared imaging device in the related art has pixels all set at a fixed sensitivity. When the setting of sensitivity to a subject temperature differs (sets-off) in a great extent from a right setting, the user must change the sensitivity setting (i.e., reset) in order to output an appropriate infrared image. To solve this problem, a structure is proposed in which the two-dimensional multiple pixels are composed of high-sensitivity pixels and low-sensitivity pixels (that is, the high-sensitivity pixels and low-sensitivity pixels are built on the substrate). The problem with this structure is that the cost is increased because the fabrication of infrared ray detection devices is difficult and that versatility is decreased because the array pattern of high-sensitivity pixels and low-sensitivity pixels cannot be changed.

To solve this problem, the present invention does not build a plurality of pixels, which have different sensitivities, on the substrate but causes a signal processor, which processes pixel signals, to set the sensitivity of each pixel. More specifically, the present invention provides a thermal-type infrared imaging device at least comprising an infrared ray detection unit in which pixels, each of which includes a bolometer element, are arranged in a two-dimensional matrix; and a signal processing unit that sequentially reads the signal of the bolometer element of each pixel through the switching operation of a horizontal shift register and a vertical shift register, integrates the read signal using an integration circuit, and outputs the integrated signal. The signal processing unit is configured so that it can set sensitivity (for example, the voltage applied to the bolometer, the capacitance of a capacitor for integrating the signal, and the period of time during which integrating of the signal is performed) for each pixel according to a predetermined pattern in synchronization with the switching operation. This configuration of the signal processing unit allows a plurality of pixels to be classified into a plurality of types of pixels having different sensitivities, for example, first type pixels for which a relatively high sensitivity (narrow temperature measurement range and high temperature resolution) is set and second type pixels for which a relatively low sensitivity (wider temperature measurement range and lower temperature resolution than those of first pixels) is set. In this way, the present invention achieves a high temperature resolution and a wide temperature measurement range at the same time. The following describes examples with reference to the drawings.

First Exemplary Embodiment

Figure 1:
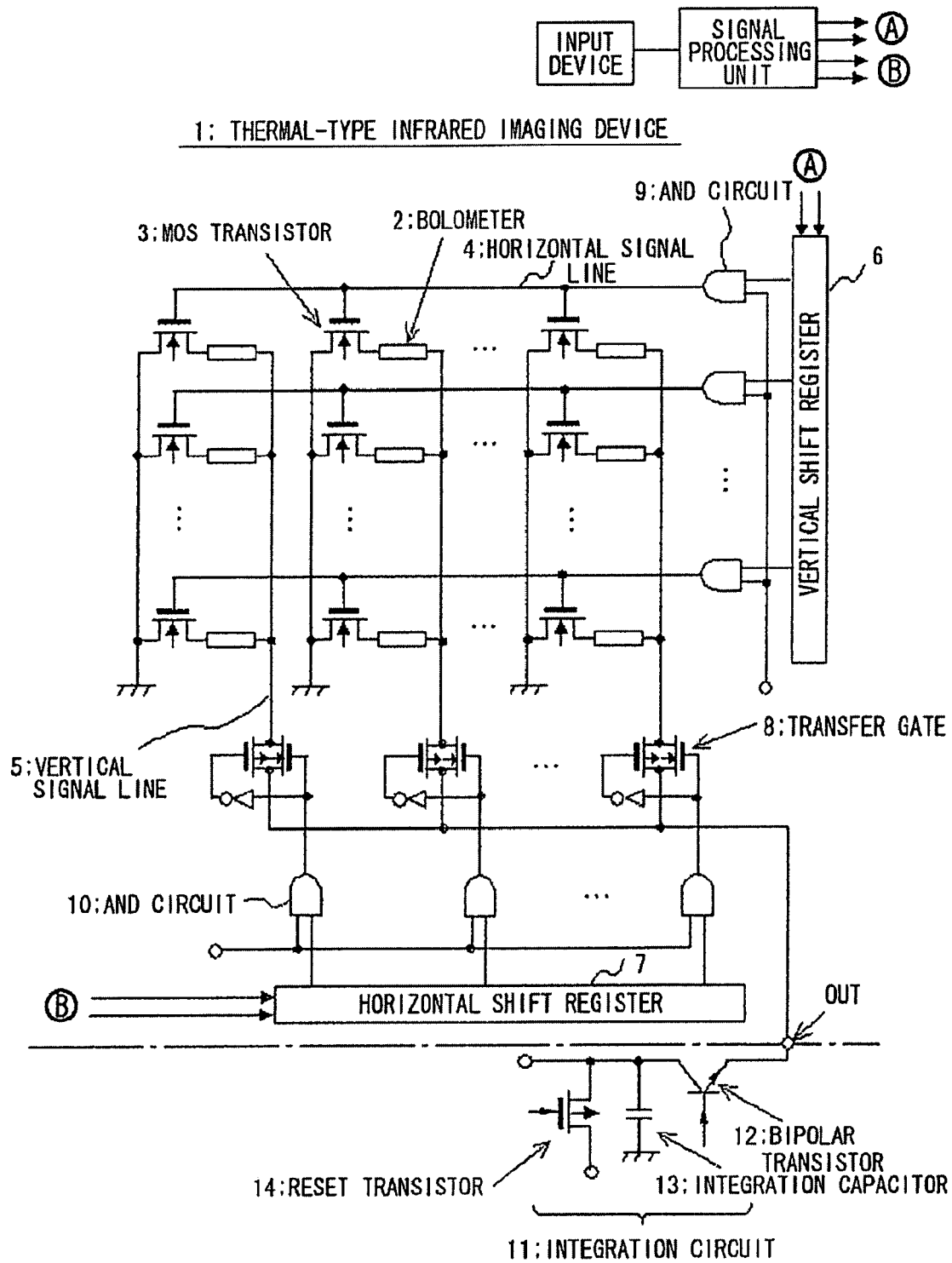
FIG. 1 is a circuit diagram showing the configuration of a thermal-type infrared imaging device in a first exemplary embodiment of the present invention.
Figure 5:
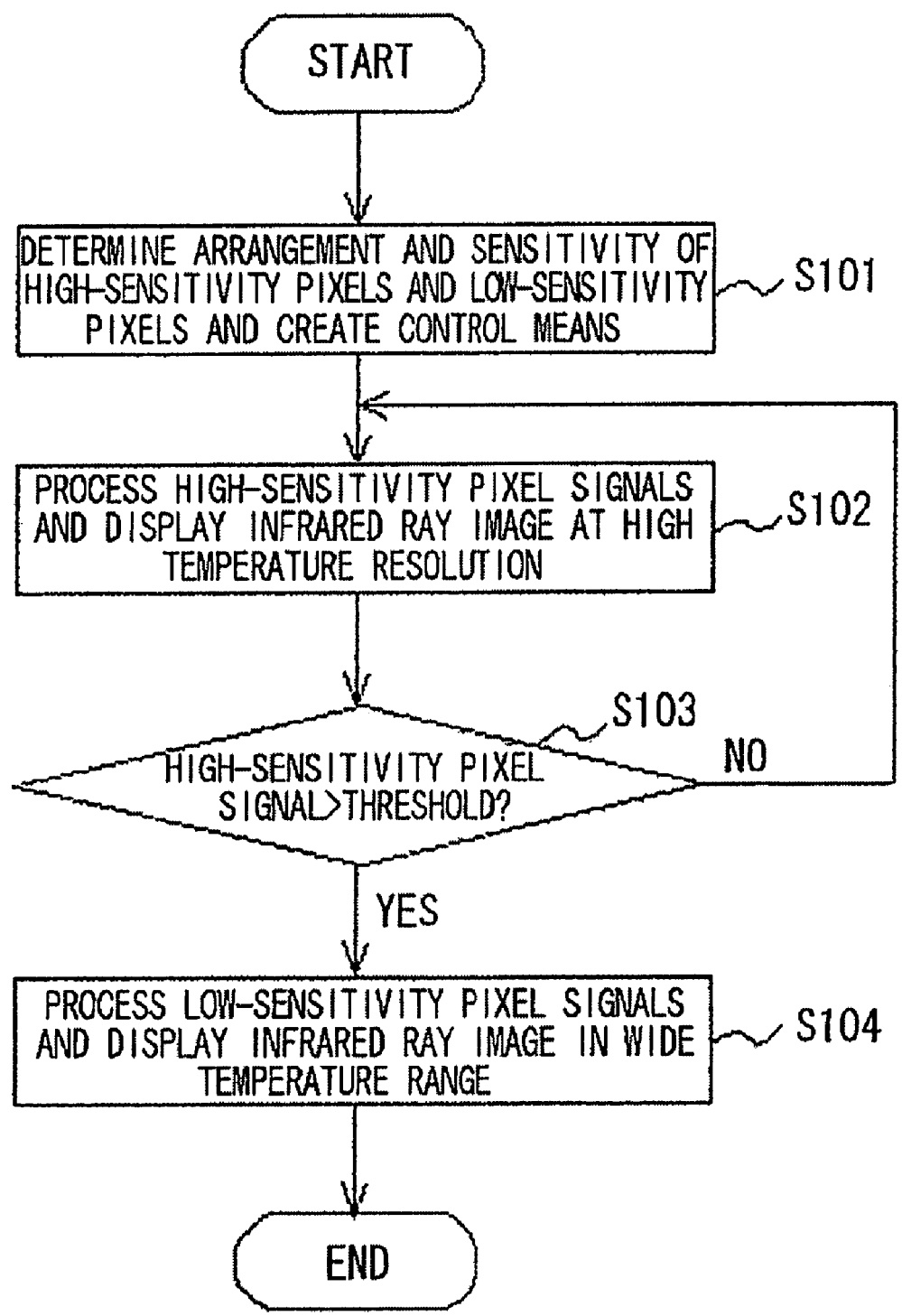
FIG. 5 is a flowchart showing the operation of the thermal-type infrared imaging device in the first exemplary embodiment of the present invention.

To describe the preferred exemplary embodiment of the present invention more in detail, a thermal-type infrared imaging device in a first exemplary embodiment of the present invention and its operation method will be described with reference to FIG. 1 to FIG. 5. FIG. 1 is a circuit diagram showing the configuration of the thermal-type infrared imaging device in this exemplary embodiment, and FIG. 2 to FIG. 4 are diagrams showing the arrangement of pixels in the thermal-type infrared imaging device in this exemplary embodiment. FIG. 5 is a flowchart showing the operation of the thermal-type infrared imaging device in this exemplary embodiment.

As shown in FIG. 1, a thermal-type infrared imaging device 1 comprises an infrared ray detection unit composed of multiple pixels arranged two dimensionally, a signal processing unit that processes signals from the infrared ray detection unit, and so on. The signal processing unit comprises internal circuits built in the substrate and external circuits provided outside the substrate. Each pixel of the infrared ray detection unit comprises an infrared ray detection device such as a bolometer 2 and a selection element such as a MOS transistor 3. The source of the MOS transistor 3 is connected to GND, the drain of the MOS transistor 3 is connected to a vertical signal line 5 via the bolometer 2, and the gate of the MOS transistor 3 is connected to a horizontal signal line 4. A transfer gate 8, composed of a P-channel MOS transistor and an N-channel MOS transistor, is connected across the vertical signal line 5 and an output terminal OUT.

The horizontal signal line 4 is sequentially selected by a vertical shift register 6 and an AND circuit 9, the vertical signal line 5 is sequentially selected by a horizontal shift register 7 and an AND circuit 10, and the signal of the bolometer 2 of the pixel at the intersection of the selected horizontal signal line 4 and the selected vertical signal line 5 is output from the output terminal OUT.

The output terminal OUT is connected to an integration circuit 11 provided outside the substrate. This integration circuit 11 comprises a switching device such as a bipolar transistor 12, whose emitter is connected to the output terminal OUT, and an integration capacitor 13 and a reset transistor 14 connected to the collector of the bipolar transistor 12. The integration circuit 11 integrates the signal of the bolometer 2 while the bipolar transistor 12 is on.

Figure 7:
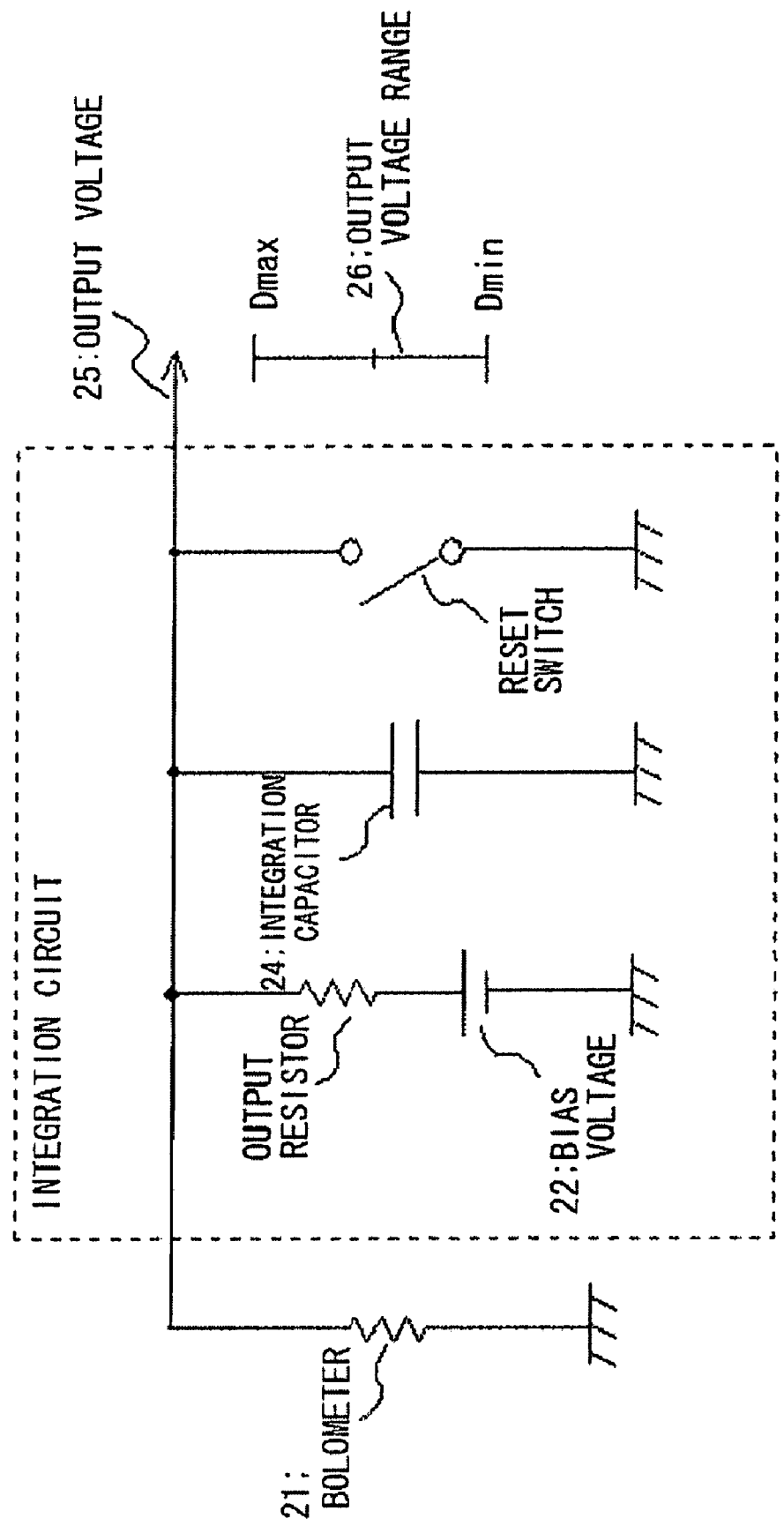
FIG. 7 is a diagram showing an integration circuit in a conventional thermal-type infrared imaging device.
Figure 8:
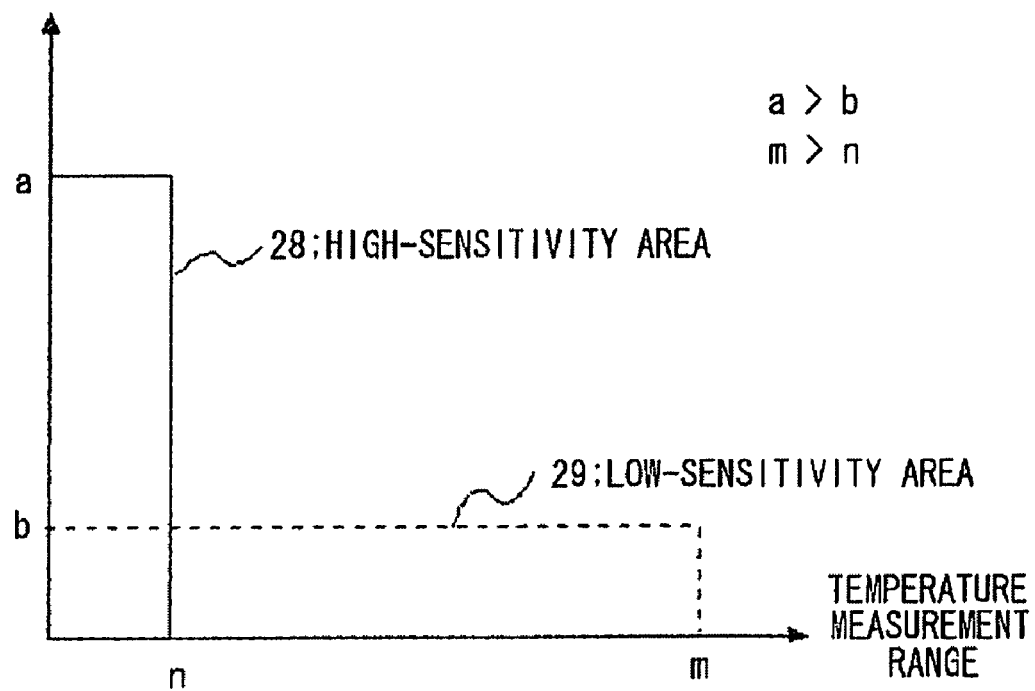
FIG. 8 is a diagram showing the relation between the temperature measurement range and the temperature resolution in a thermal-type infrared imaging device, analyzed according to the present invention.

The thermal-type infrared imaging device 1, which has the configuration described above, has a plurality of bolometers 2 each of which has the configuration shown in FIG. 7. As described above, the output voltage of the bolometer 2 varies according to the bias voltage applied to the bolometer 2, the capacitance of the integration capacitor 13, and the integration time. In this exemplary embodiment, control means (not shown) for setting those values is provided in the signal processing unit (or a control program that functions as control means is executed in the signal processing unit). The control means performs operation according to the switching operation of the vertical shift register 6 and the horizontal shift register 7 (that is, the control means performs operation based on the synchronization signal received by the vertical shift register 6 and the horizontal shift register 7) to allow the sensitivity to be changed for each pixel according to a predetermined pattern. That is, the bias voltage is decreased, the capacitance of the integration capacitor 13 is increased, or the integration time is shortened so as to set the sensitivity low; or the bias voltage is increased, the capacitance of the integration capacitor 13 is decreased, or the integration time is prolonged so as to set the sensitivity high. The actual configuration of the control means given above is not limited to a particular configuration but may be any configuration where the bias voltage, the capacitance of the integration capacitor 13, and the integration time can be adjusted.

FIG. 2 is a diagram showing an arrangement of pixels whose sensitivity is adjusted by the control means described above. The control means sets the sensitivity of each pixel so that a high-sensitivity pixel 15 (pixel indicated by H) having a relatively high sensitivity and a low-sensitivity pixel 16 (indicated by L) having a relatively low sensitivity occur alternatively. Although the example in FIG. 2 has a total of 24 pixels (six pixels in horizontal direction by four pixels in vertical direction), an array of any number of pixels may be used as long as multiple pixels are arranged two dimensionally. Although the high-sensitivity pixel 15 and the low-sensitivity pixel 16 occur alternately in FIG. 2, the sensitivity of each pixel may be set by the control means as shown in FIG. 3 in such a way that a group of multiple pixels (four pixels in this example) of the same type and another group of multiple pixels occur alternately. Although the sensitivity is set in such a way that the number of high-sensitivity pixels 15 equals the number of low-sensitivity pixels 16 in FIG. 2 and FIG. 3, respectively, the sensitivity may be set by the control means as shown in FIG. 4 in such a way that the number of pixels of one of two types (low-sensitivity pixel 16 in this example) is smaller than the number of pixels of the other type.

Next, the following describes the operation method of the thermal-type infrared imaging device, in which multiple pixels are classified into high-sensitivity pixels 15 and low-sensitivity pixels 16 according to a predetermined pattern, with reference to the flowchart in FIG. 5.

First, in step S101 just after "start", the thermal-type infrared imaging device determines how to arrange the high-sensitivity pixels 15 and the low-sensitivity pixels 16, as well as the sensitivity (bias voltage value, capacitance value of the integration capacitor 13, and the integration time) of the high-sensitivity pixels 15 and the low-sensitivity pixels 16, respectively, and forms (or establishes) control means in the signal processing unit for setting the sensitivity of the pixels according to a given (or desired) arrangement and a given (or desired) sensitivity.

Next, in step S102, the thermal-type infrared imaging device uses the infrared ray detection unit, in which the pixels are arranged, and the signal processing unit, in which the control means is formed, to image (i.e., take a shot of one frame of image on) a subject for creating an image data. At this time, the thermal-type infrared imaging device does not process all signals from both the high-sensitivity pixels 15 and the low-sensitivity pixels 16 but, in the initial state, processes only the signals from the high-sensitivity pixels 15 and displays an infrared ray image that is imaged in a narrow temperature range near the room temperature at a high resolution.

Next, in step S103, the thermal-type infrared imaging device measures the signal level of the high-sensitivity pixel 15 and compares the signal level with a predetermined threshold. If the signal level exceeds the threshold (that is, if the signal of the high-sensitivity pixel 15 is saturated), the thermal-type infrared imaging device processes only the signal(s) from the low-sensitivity pixels 16 in step S104 and displays an infrared ray image that is imaged in a wide temperature range including a high temperature at a low resolution.

As described above, because multiple pixels are classified into high-sensitivity pixels 15 and the low-sensitivity pixels 16 according to a predetermined pattern, the thermal-type infrared imaging device in this exemplary embodiment can achieve a fine temperature resolution at a temperature near the room temperature and, at the same time, achieve a temperature measurement range that is wide enough to measure a high-temperature subject.

In the example given above, the thermal-type infrared imaging device processes only signals from the high-sensitivity pixels 15 in the initial state and, when the signals of the high-sensitivity pixels 15 are saturated, processes only signals from the low-sensitivity pixels 16. Instead of this processing sequence, it is possible to use the processing sequence in which the thermal-type infrared imaging device processes signals from the low-sensitivity pixels 16 first to get the general temperature distribution of a subject and, after confirming that the signals from high-sensitivity pixels 15 are not saturated, processes the signals from the high-sensitivity pixels 15. It is also possible to use a display mode in which the high-sensitivity pixels 15 and the low-sensitivity pixels 16 are displayed in the same format or to use another display mode in which the gray scale mode is used for the signals from the high-sensitivity pixels 15 and the color display mode is used for the signals from the low-sensitivity pixels 16.

Second Exemplary Embodiment

Next, a thermal-type infrared imaging device in a second exemplary embodiment of the present invention and its operation method will be described with reference to FIG. 6. FIG. 6 is a diagram showing the arrangement of pixels in the thermal-type infrared imaging device in this exemplary embodiment.

In the first exemplary embodiment described above, the multiple devices arranged in a two-dimensional matrix are classified into high-sensitivity pixels 15 and low-sensitivity pixels 16. In this exemplary embodiment, the multiple devices arranged two-dimensionally are classified into three types as shown in FIG. 6, that is, high-sensitivity pixels (H) 15, low-sensitivity pixels (L) 16, and intermediate-sensitivity pixels 17 (pixel indicated by M) that has a sensitivity lying between the high sensitivity and the low sensitivity. Those three types of pixels are used to achieve three types of sensitivities at the same time Those three types of sensitivities enable a subject to be imaged in various temperature ranges and at the optimum sensitivity.

Although the multiple devices arranged in the two-dimensional matrix are classified into three types (high-sensitivity pixels 15, intermediate-sensitivity pixels 17, and low-sensitivity pixels 16) in FIG. 6, the multiple devices may be classified into four types or more. The arrangement pattern of pixels, each with a particular sensitivity, is not limited to the patterns shown in the figures. As in the first exemplary embodiment, a group of multiple pixels of the same type and another group of multiple pixels may occur alternately or the number of pixels may be varied from type to type.

It is also possible to calculate the eigenvector through principal component analysis of signal value, read from the pixel or pixels contiguous to one pixel, and determine a point in the calculated eigenspace as a pixel signal value.

Although a thermal-type infrared imaging device, which uses bolometers as the infrared ray detection devices, is used in the embodiments given above, the present invention is not limited thereto but may be applied to any thermal-type infrared imaging device that reads the signals of the infrared detection devices of the pixels by the switching operation and amplifies or integrates the signals, which are read, by the signal processing unit for output.

The present invention is applicable to any thermal-type infrared imaging device and its operation method wherein multiple pixels are arranged two-dimensionally and the output voltage of each pixel can be adjusted. Similarly, the present invention is also applicable to any imaging device other than the thermal-type infrared imaging device and its operation wherein multiple pixels are arranged two-dimensionally and the output voltage of each pixel can be adjusted.

It should be noted that other objects, features and aspects of the present invention will become apparent in the entire disclosure and that modifications from the disclosed embodiments may be done without departing the scope of the present invention claimed as appended herewith.

Also it should be noted that any combination of the disclosed and/or claimed elements, matters and/or items may fall under the modifications aforementioned.

What is claimed is:

1. A thermal-type infrared imaging device comprising:
an infrared ray detection unit having a plurality of two-dimensionally arranged pixels, each pixel including an infrared ray detection device to convert an infrared ray of a subject to an electrical signal; and,
a signal processing unit to process signals from said infrared ray detection unit;
wherein said signal processing unit is to set a sensitivity of each pixel according to a predetermined pattern for classifying said pixels into pixels of a plurality of types having different sensitivities,
wherein said plurality of types of pixels comprise pixels of a first type for which a relatively high sensitivity is set and pixels of a second type for which a relatively low sensitivity is set, the pixels of the infrared ray detection unit being arranged in such a way that pixels of the same type are not adjacent to one another, and
wherein the thermal-type infrared imaging device is to generate an infrared ray image based on signals from the pixels of the first type and, if the signals from the pixels of the first type exceed a predetermined threshold, the thermal-type infrared imaging device is to generate the infrared ray image based on signals from the pixels of the second type.

2. The thermal-type infrared imaging device as defined by claim 1, wherein said infrared ray detection device is a bolometer element whose resistance value varies according to an amount of received infrared ray or rays.

3. The thermal-type infrared imaging device as defined by claim 1, wherein said pixels are classified into at least 3 types having different sensitivities.

4. The thermal-type infrared imaging device as defined by claim 1, wherein said pixels are classified into a plurality of types of sensitivities which are different in number of pixels.

5. The thermal-type infrared imaging device as defined by claim 1, wherein the device further comprises:
means for patterning said plurality of pixels classified into the types of different sensitivities;
said patterning being controlled by a combination of shift registers operating in directions orthogonal to one another pixel.

6. The thermal-type infrared imaging device as defined by claim 5, wherein said means for patterning is controlled by at least one signal indicative of said predetermined pattern, said at least one signal being formed in said signal processing unit according to an external input.

7. A thermal-type infrared imaging device comprising:
an infrared ray detection unit having a plurality of two-dimensionally arranged pixels, each pixel including an infrared ray detection device to convert an infrared ray of a subject to an electrical signal; and
a signal processing unit to sequentially read a signal from each infrared ray detection device through a switching operation and to amplify and process the signal according to a sensitivity that is set;
wherein said signal processing unit comprises control means for setting the sensitivity of each of said pixels according to a predetermined pattern,
wherein said plurality of pixels are classified by said control means into a plurality of types of pixels having different sensitivities,
wherein said plurality of types of pixels comprise pixels of a first type for which a relatively high sensitivity is set and pixels of a second type for which a relatively low sensitivity is set, the pixels of the infrared ray detection unit being arranged in such a way that pixels of the same type are not adjacent to one another, and
wherein the thermal-type infrared imaging device is to generate an infrared ray image based on signals from the pixels of the first type and, if the signals from the pixels of the first type exceed a predetermined threshold, the thermal-type infrared imaging device is to generate the infrared ray image based on signals from the pixels of the second type.

8. The thermal-type infrared imaging device as defined by claim 7, wherein said control means sets the sensitivity by adjusting at least one of a voltage applied to said infrared ray detection device, a capacitance of a capacitor for integrating the signal, and a period of time for integrating the signal.

9. The thermal-type infrared imaging device as defined by claim 7, wherein said infrared ray detection device is a bolometer element whose resistance value varies according to an amount of received infrared ray or rays.

10. An operation method for operating a thermal-type infrared imaging device comprising:
an infrared ray detection unit having a plurality of two-dimensionally arranged pixels, each pixel including an infrared ray detection device to convert an infrared ray of a subject to an electrical signal; and
a signal processing unit to process signals from said infrared ray detection unit,
wherein said operation method comprising:
a first step of setting, by said signal processing unit, a sensitivity for each of said pixels according to a predetermined pattern for classifying said plurality of pixels into a plurality of types of pixels having different sensitivities; and
a second step of processing signals from one of the types of pixels according to the temperature of the subject,
wherein said plurality of types of pixels comprises pixels of a first type for which a relatively high sensitivity is set and pixels of a second type for which a relatively low sensitivity is set, the pixels being arranged in such a way that pixels of the same type are not adjacent to one another, and
wherein in said second step, an infrared ray image is generated based on signals from the pixels of the first type and, if the signals from the pixels of the first type exceed a predetermined threshold, the infrared ray image is generated based on signals from the pixels of the second type.

11. The operation method as defined by claim 10, wherein, in said first step, the sensitivity is set by adjusting at least one selected from a group consisting of a voltage applied to said infrared ray detection device, a capacitance of a capacitor for integrating the signal and a period of time for integrating the signal.

12. The operation method as defined by claim 10, wherein said infrared ray detection device is a bolometer element whose resistance value varies according to an amount of received infrared ray or rays.

13. An imaging device comprising:
a ray detection unit having a plurality of two-dimensionally arranged pixels, each pixel including a ray detection device to convert a ray of a subject to an electrical signal; and
a signal processing unit to process signals from said ray detection unit,
wherein said signal processing unit is to set a sensitivity of each pixel according to a predetermined pattern for classifying said pixels into pixels of a plurality of types having different sensitivities, wherein said plurality of types of pixels comprise pixels of a first type for which a relatively high sensitivity is set and pixels of a second type for which a relatively low sensitivity is set, the pixels of the ray detection unit being arranged in such a way that pixels of the same type are not adjacent to one another, and wherein the imaging device is to generate a ray image based on signals from the pixels of the first type and, if the signals from the pixels of the first type exceed a predetermined threshold, the imaging device is to generate the ray image based on signals from the pixels of the second type.

14. The imaging device as defined by claim 13, wherein:

said signal processing unit sequentially reads a signal of each of said ray detection devices through a switching operation and amplifies and processes the signal according to a sensitivity that is set; and said signal processing unit comprises control means for setting the sensitivity of each of said pixels according to a predetermined pattern such that said plurality of pixels are classified by said control means into a plurality of types of pixels having different sensitivities.

15. The imaging device as defined by claim 14, wherein said control means sets the sensitivity by adjusting at least one of a voltage applied to said ray detection device, a capacitance of a capacitor for integrating the signal, and a period of time for integrating the signal.

16. The imaging device as defined by claim 13, wherein said pixels are classified into at least 3 types having different sensitivities.

* * * * *